United States Patent
Kao et al.

(10) Patent No.: US 8,378,940 B2
(45) Date of Patent: Feb. 19, 2013

(54) DISPLAY APPARATUS

(75) Inventors: Kuo-Feng Kao, Hsin-Chu (TW);
Zeng-De Chen, Hsin-Chu (TW);
Tsung-Chin Cheng, Hsin-Chu (TW);
Keh-Long Hwu, Hsin-Chu (TW);
Weng-Bing Chou, Hsin-Chu (TW);
Seok-Lyul Lee, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 1033 days.

(21) Appl. No.: 12/390,640

(22) Filed: Feb. 23, 2009

(65) Prior Publication Data
US 2010/0109988 A1  May 6, 2010

(30) Foreign Application Priority Data
Oct. 31, 2008  (TW) ............................... 97142072 A

(51) Int. Cl.
*G09G 3/36* (2006.01)
(52) U.S. Cl. ........... 345/87; 345/102; 345/905; 348/761
(58) Field of Classification Search .................. 362/613; 348/761, 59; 353/38
See application file for complete search history.

(56) References Cited

U.S. PATENT DOCUMENTS

| | | | | |
|---|---|---|---|---|
| 5,083,199 | A | * | 1/1992 | Borner ............................. 348/59 |
| 5,706,062 | A | * | 1/1998 | Stolov ............................ 348/761 |
| 5,758,940 | A | * | 6/1998 | Ogino et al. .................... 353/38 |
| 6,166,787 | A | | 12/2000 | Akins et al. |
| 6,999,146 | B2 | | 2/2006 | Liu |
| 7,034,908 | B2 | | 4/2006 | Liu |
| 7,038,749 | B2 | | 5/2006 | Liu |
| 7,082,236 | B1 | | 7/2006 | Moore |
| 2006/0139952 | A1 | * | 6/2006 | Inoue et al. ................... 362/613 |
| 2007/0188667 | A1 | | 8/2007 | Schwerdtner |

FOREIGN PATENT DOCUMENTS

| | | |
|---|---|---|
| TW | 588195 | 5/2004 |
| TW | I276894 | 3/2007 |
| TW | 200722815 A | 6/2007 |
| TW | 200823494 A | 6/2008 |

OTHER PUBLICATIONS

English language translation of abstract of TW I276894.
English translation of abstract and pertinent parts of TW 588195.
English translation of abstract of TW 200823494 A.
English translation of abstract of TW 200722815 A.
Taiwan Notice of Allowance issued Apr. 25, 2012.

* cited by examiner

*Primary Examiner* — Quan-Zhen Wang
*Assistant Examiner* — Troy Dalrymple
(74) *Attorney, Agent, or Firm* — McClure, Qualey & Rodack, LLP

(57) ABSTRACT

A display apparatus is disclosed, and comprises a display panel and a lens. On the display panel, there are a width-fixed pixel zone, a width-variating pixel zone and a border zone arranged sequentially from the center to the edges of the display panel, wherein there are a plurality of width-fixed pixels disposed in the width-fixed zone, and there are a plurality of width-variating pixel groups disposed in the width-variating pixel zone, and the widths of the width-variating pixel groups are present in a first decreasing sequence. The lens has a focus-length-variating portion and a planar portion, wherein the planar portion is aligned with the width-fixed pixel zone, and the focus-length-variating portion is disposed to correspond to the border zone and the width-variating pixel zone. The focus lengths of the focus-length-variating portion corresponding to the width-variating pixel groups are present in a second decreasing sequence.

18 Claims, 5 Drawing Sheets

DISPLAY APPARATUS

RELATED APPLICATIONS

This application claims priority to Taiwan Application Serial Number 97142072, filed Oct. 31, 2008, which is herein incorporated by reference.

BACKGROUND

1. Field of Invention

The present invention relates to a display apparatus. More particularly, the present invention relates to a display apparatus comprising a lens with variating focus lengths and a display panel with pixels having non-periodically variating widths.

2. Description of Related Art

In the process for manufacturing a liquid crystal display (LCD), due to the causes from a panel circuit wiring layout, a mold frame and cutting tolerances, the frame border area located at four surrounding edges of a LCD panel cannot display any image, and thus an irremovable border area with non-light emitted is formed around the display panel, resulting in less viewable area on the display panel. In order to reduce the border area with non-light emitted for magnifying the viewable area on the display panel, a conventional skill is directed to mounting a magnifying lens or circular Fresnel lens above a LCD panel for directly performing 2-dimensional area magnification to shield the aforementioned non-light emitting border area by generating a virtual image.

However, the conventional skill using the magnifying lens may cause sever spherical aberration and chromatic aberration, and the lens itself is quite heavy and thick, and thus is disadvantageous to the application of portable display emphasizing the features of lightness and thinness. As to the conventional skill using the circular Fresnel lens, although it may be able to reduce the thickness and weight of the lens, yet the periodical structure of the Fresnel lens may interfere with the pixels area on the LCD panel to cause interference stripes, such as Moire patterns, etc. Particularly, when being viewed with a large slant view angle, the image shown on the LCD panel is further affected by an overlarge facet angle or slope angle of a micro-prism structure on the circular Fresnel lens, and darker and lighter stripes or ghosting phenomena are generated thereby, thus resulting in visual defects.

SUMMARY

Hence, an aspect of the present invention is to provide a display apparatus for magnifying the display area on a display panel; reducing the size of non-light emitting area on the display panel; and reducing the occurrence of Moire stripes, darker and lighter stripes and image ghosting problems.

Another aspect of the present invention is to provide a display apparatus for promoting the resolution uniformity of the display panel and increasing the slant angle allowed for viewing the display panel.

In accordance with an embodiment of the present invention, the display apparatus comprises a display panel and a lens. The display panel of this embodiment has a width-fixed pixel zone, a width-variating pixel zone and a border zone arranged sequentially from its center to its edges, wherein there are a plurality of width-fixed pixels disposed in the width-fixed pixel zone, and there are a plurality of width-variating pixel groups disposed in the width-variating pixel zone, the width-variating pixel groups having respective widths present in a first decreasing sequence $\{P_1, P_2, \ldots, P_N\}$, wherein $P_0 > P_1$, $P_0$ representing the width of each of the width-fixed pixels. The lens of this embodiment has a focus-length-variating portion and a planar portion, wherein the planar portion is aligned with the width-fixed pixel zone, and the focus-length-variating portion is disposed to correspond to the border zone and the width-variating pixel zone, the focus-length-variating portion having a plurality of microstructure groups, and respective focus lengths of the focus-length-variating portion corresponding to the width-variating pixel groups are present in a second decreasing sequence $\{f_1, f_2, \ldots, f_N\}$, wherein the number of the width-variating pixel groups and the number of the microstructure groups are the same as an integer N. Each of the microstructure groups may has at least one microstructure, and the microstructures within the same microstructure group have the same focus length.

According to another embodiment of the present invention, the display apparatus comprises a display panel and a lens. The display panel of this embodiment has a width-fixed pixel zone, a width-variating pixel zone and a border zone arranged sequentially from its center to its edges, wherein there are a plurality of width-fixed pixels disposed in the width-fixed zone, and there are a plurality of width-variating pixel groups disposed in the width-variating pixel zone. The lens of this embodiment has a focus-length-variating portion and a planar portion, wherein the planar portion is aligned with the width-fixed pixel zone, and the focus-length-variating portion is disposed to correspond to the border zone and the width-variating pixel zone, the focus-length-variating portion having a plurality of microstructure groups. The display panel is spaced from the lens at a distance d; each of the width-fixed pixels has a width $P_0$; the number of the width-variating pixel groups and the number of the microstructure groups are the same as an integer N, and the i-th width-variating pixel group has a width $P_i$, wherein i=1, 2, ..., N; the focus-length-variating portion corresponding to the j-th width-variating pixel group has a focus length $f_j$, j=1, 2, ..., N; and the j-th width-variating pixel group has a magnification ratio $m_j$, and $m_j$ is present in a decreasing sequence $\{m_1, m_2, \ldots, m_N\}$.

With the application of the aforementioned display apparatus, the size of non-light emitting area on a display panel can be reduced; the thickness and weight can reduced by using a Fresnel lens, and the occurrence of interference stripes can be reduced via a planar portion located at a central portion of the lens; and the Fresnel lens with variating focus lengths and the pixel groups having non-periodically variating widths are used together to promote the resolution uniformity of the display panel and increase the slant angle allowed for viewing the display panel.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
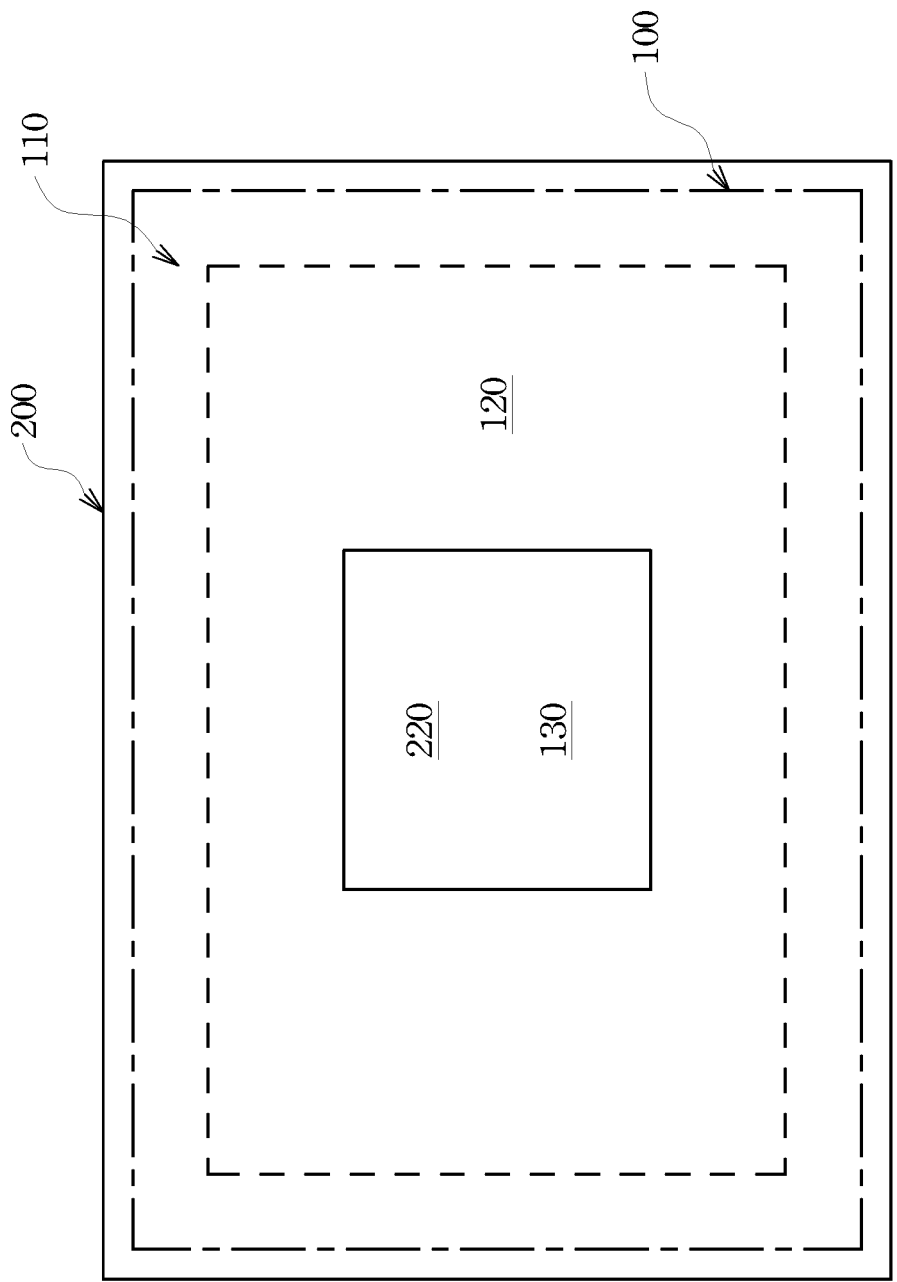
FIG. 1 is a schematic top view of a display apparatus according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
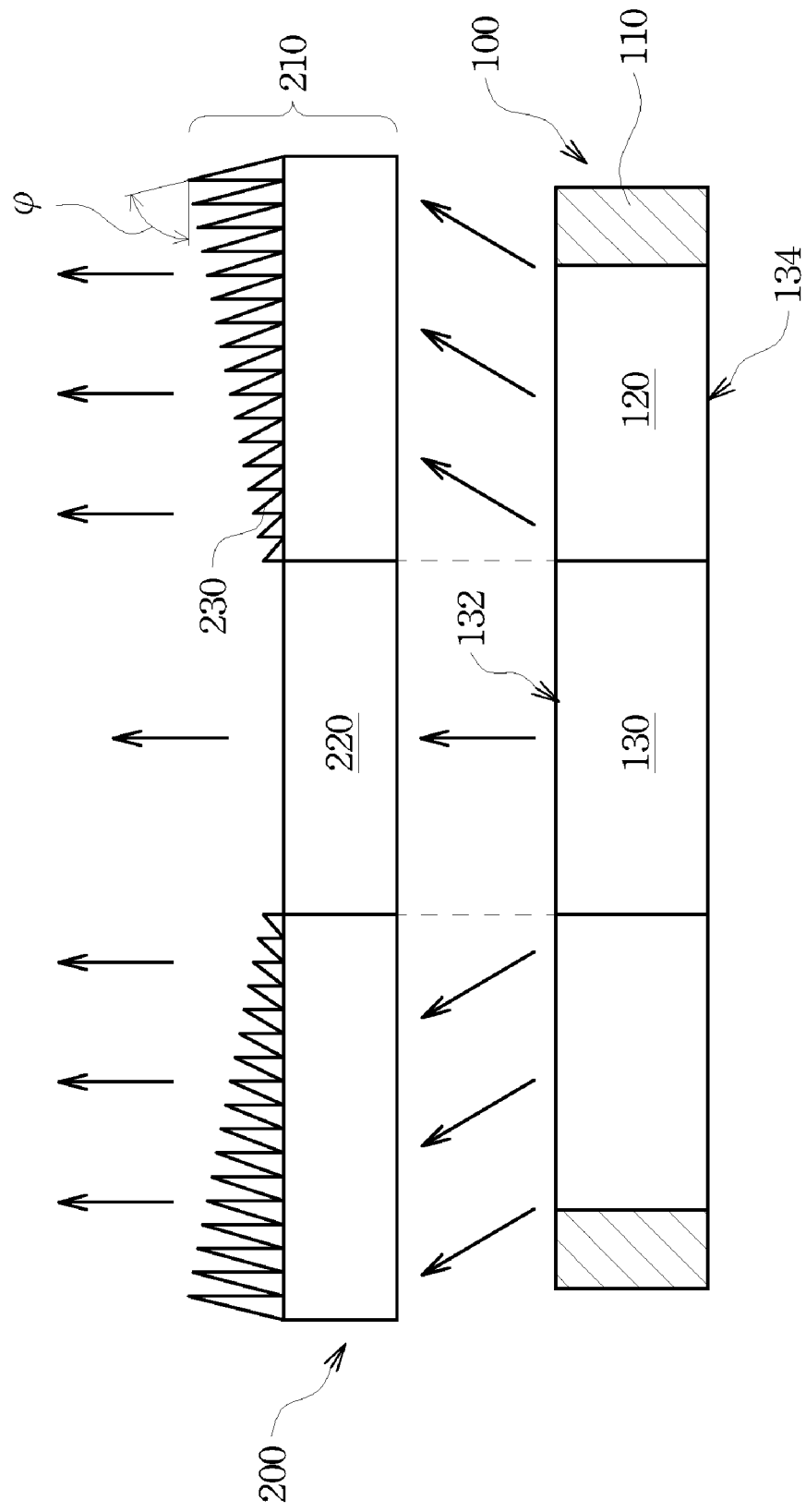
FIG. 2 is an exploded front view of the display apparatus shown in FIG. 1.

Referring to FIG. 1 and FIG. 2, FIG. 1 and FIG. 2 are schematic top and exploded front views of a display apparatus according to an embodiment of the present invention. The display apparatus of this embodiment comprises a lens 200 and a display panel 100, wherein the area of the lens 200 is greater than or equals to that of the display panel 100, and the lens 200 shields the entire surface of the display panel 100. On the display panel 100, a width-fixed pixel zone 130, a width-variating pixel zone 120 and a border zone 110 are arranged sequentially from its center to its edges, wherein the border zone 110 is a non-light emitting area, and the width-fixed pixel zone 130 and the width-variating pixel zone 120 are viewable areas (light-emitting area). The lens 200 has a focus-length-variating portion 210 and a planar portion 220, wherein the planar portion 220 is aligned with the width-fixed pixel zone 130, and the focus-length-variating portion 210 is disposed to correspond to the border zone 110 and the width-variating pixel zone 120, and the focus-length-variating portion 210 has a plurality of microstructure groups 230. An angle included between each of the microstructure groups 230 and the planar portion 220 is ranged between 0° and 41°, and the maximum angle φ between each of the microstructure groups 230 and the planar portion 220 can be 41°. In the present embodiment, the microstructures within the same microstructure group are all identical. Therefore, the angle included between the microstructure group and the planar portion 220 equals to the angle included between each of the microstructures within the same microstructure group and the planar portion 220. The focus-length-variating portion 210 of the lens 200 can be such as a Fresnel lens. When the display apparatus of this embodiment is in operation, light enters the display panel 100 via a light incident surface 134 thereof, and then an image is transmitted from a light emitting surface 132 thereof to a user's eyes after being magnified by the lens 200, thereby achieving the efficacy of shielding the border zone 110 for reducing the non-light emitting area on the display panel 100.

Figure 3:
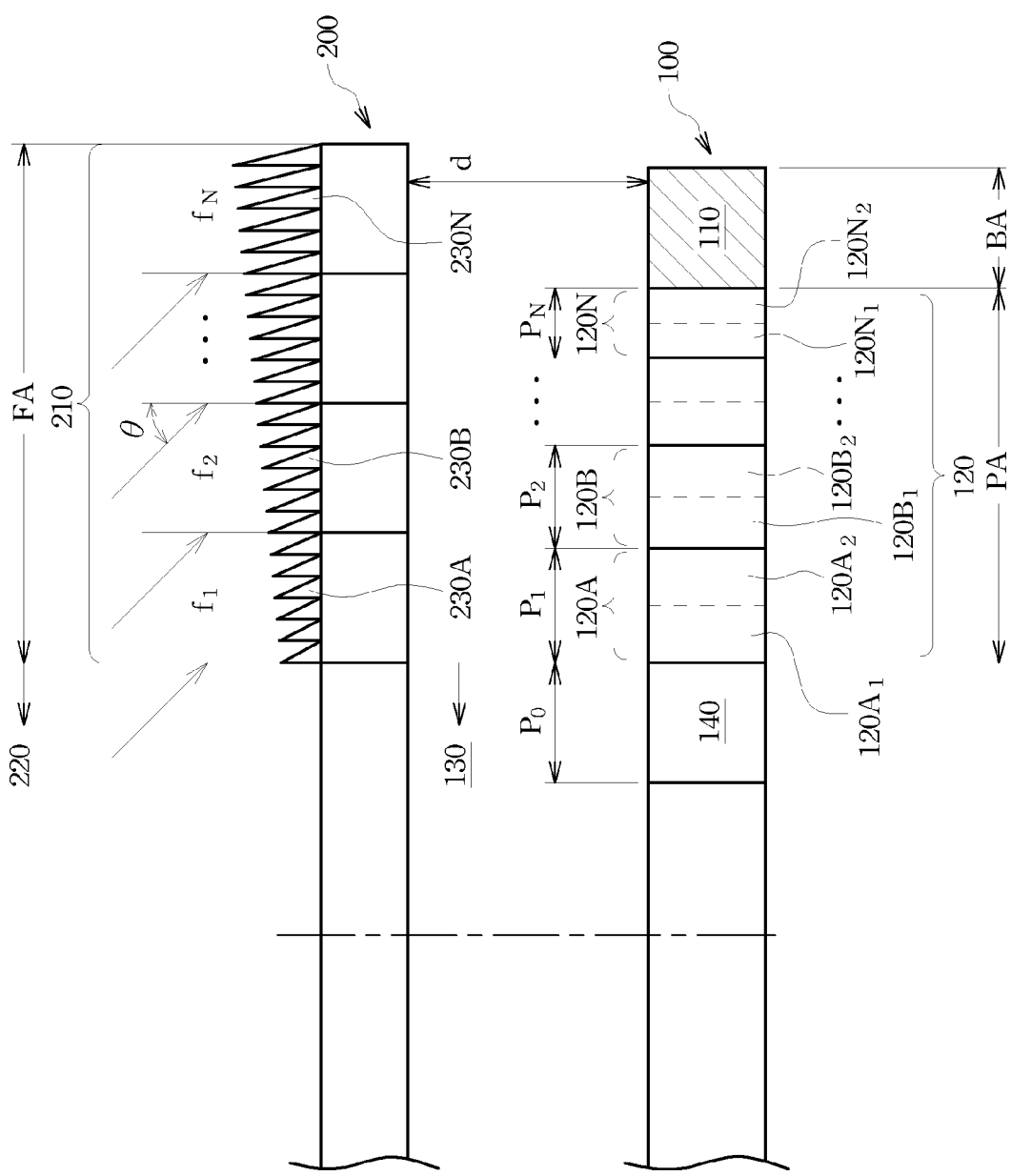
FIG. 3 is a schematic diagram showing a locally enlarged FIG. 2.

Referring to FIG. 3, FIG. 3 is a schematic diagram showing a locally enlarged FIG. 2. There are a plurality of width-fixed pixels 140 disposed in width-fixed zone 130 of the display panel 100, and the widths of all of the width-fixed pixels 140 are the same as a width $P_0$. There are a plurality of width-variating pixel groups 120A, 120B, ..., 120N disposed in the width-variating pixel zone 120, and the respective widths of the width-variating pixel groups 120A, 120B, ..., 120N are present in a first decreasing sequence $\{P_1, P_2, ..., P_N\}$, wherein the width-variating pixel group 120A with the width $P_1$ is disposed closest to the width-fixed zone 130, and the width-variating pixel group 120N with the width $P_N$ is disposed closest to the border zone 110, and $P_0 > P_1$, i.e. the widths $P_1, P_2, ..., P_N$ of the width-variating pixel groups 120A, 120B, 120N are decreasing in sequence.

Correspondingly, the focus-length-variating portion 210 of the lens 200 has a plurality of microstructure groups 230A, 230B, ..., 230N, and the respective focus lengths of the focus-length-variating portion 210 corresponding to the width-variating pixel groups 120A, 120B, ..., 120N are present in a second decreasing sequence $\{f_1, f_2, ..., f_N\}$, i.e. the first decreasing sequence $\{P_1, P_2, ..., P_N\}$ and the second decreasing sequence $\{f_1, f_2, ..., f_N\}$ mutually correspond to each other. In this embodiment, the lens 200 having a planar lens (planar portion 220) at its central portion and the focus-length-variating portions 210 at its both sides is used to thin the lens, to reduce the non-light emitting area, and to lower the influence due to spherical aberration and chromatic aberration, and the focus-length-variating portions 210 are collaborated with the width-variating pixel zone 120 with the pixel groups having non-periodically variating widths so as to promote the resolution uniformity of the display panel 100 and to increase a user's view angle or slant angle θ allowed for viewing the display panel, wherein the view angle or slant angle θ in this embodiment can be ranged between 44.7° and 45.3°.

The design principles of this embodiment is described as follows, and the actual application is also explained in conjunction with an accompanying example.

The First Decreasing Sequence $\{P_1, P_2, ..., P_N\}$

Such as shown in FIG. 3, the number of the width-variating pixel groups 120A, 120B, ..., 120N and the number of the microstructure groups 230A, 230B, ..., 230N are the same as an integer N, and each of the width-variating pixel groups 120A, 120B, ..., 120N is composed of at least one width-variating pixel, such as $120A_1/120A_2$, $120B_1/120B_2$, ..., or $120N_1/120N_2$. The total number of the width-variating pixels of the width-variating pixel groups is a total count M, and thus the number of the width-variating pixels in each of the width-variating pixel groups 120A, 120B, ..., 120N is M/N. In this embodiment, M/N is equal to 2, but is not limited thereto.

At first, this embodiment is based on the user's slant angle θ and the distance d between the display panel 100 and the lens 200 to calculate the total count M in accordance with the following relationship:

$$M \geq (d \times \tan \theta)/P_0 \quad (1)$$

wherein M is a positive integer.

Example: Let say the distance d is $1 \times 10^{-3}$ m; the slant angle θ is 45°; and the width $P_0$ is $150 \times 10^{-6}$ m. Then, according to equation (1), $M \geq 1 \times 10^{-3} \times \tan 45°/1 \times 10^{-6} = 6.67$, i.e. M is an integer greater than or equal to 6.67. For calculation convenience, M may be taken as an even integer, 8.

Thereafter, an allowable pixel difference PD between two adjacent pixels is determined, wherein human eyes will not notice a width difference between two adjacent pixels as long as this width difference is within the allowable pixel difference PD. This embodiment is based on a view distance VD between the user and the display panel, and a visual angle α (ranged between 0.019° and 0.021°) of human eyes to calculate an allowable pixel difference PD between two adjacent pixels, i.e. the absolute value of the width difference between two adjacent pixels in the width-variating pixel zone 120, $|P_i - P_{i-1}|$, i=1~M, in accordance with the following relationship:

$$PD \leq (VD \times \tan \alpha)/M \quad (2)$$

Example (continued): Let say the view distance VD is $20 \times 10^{-2}$ m; the visual angle α is 0.02°. Then, according to equation (2), $PD \leq (20 \times 10^{-2} \times \tan 0.02°)/8 = 8.7 \times 10^{-6}$. For calculation convenience, the allowable pixel difference PD may be taken as $8 \times 10^{-6}$ m, meaning that the pixel groups at most can be varied by 8 μm for each time magnification or shrinkage. In other words, if a width difference between two adjacent pixel groups is greater than $8\times10^{-6}$ m, then human eyes will be able to tell the width difference between pixels, thus affecting visual effect. On the other hand, if a width difference between two adjacent pixel groups is less than or equals to $8\times10^{-6}$ m, then human eyes will identify two adjacent pixels as the same kind of pixel and will not tell the width difference between them.

Thereafter, the magnification ratio of the width $P_N$, i.e. the smallest magnification ratio $m_N$ of the width-variating pixel group, is calculated in accordance with the following relationship:

$$m_N=PA/FA; \quad (3)$$

$$P_N=P_0\times m_N; \quad (4)$$

wherein PA representing the width of the width-variating pixel zone 120, and FA represents the width of the focus-length-variating portion 210.

Example (continued): Let say the width PA is $4\times10^{-3}$ m; the width FA is $5\times10^{-3}$ m. Then, according to equations (3) and (4), the minimum magnification ratio $m_N$ of the width $P_N$ is $4\times10^{-3}/5\times10^{-3}=0.8$, and the width $P_N$ is $150\times10^{-6}\times0.8=120\times10^{-6}$ m, meaning that the smallest magnification ratio of the width-variating pixel groups is 0.8, i.e. the magnification ratios of the width-variating pixel groups have to be gradually decreased from 1 to 0.8 so as to shield the width BA of the border zone 110, wherein $FA\geq PA+BA$.

Thereafter, the number N of the width-variating pixel groups (or microstructure groups) is calculated in accordance with the following relationship:

$$N\geq(P_0-P_N)/PD \quad (5)$$

wherein N is a positive integer.

Example (continued): Let say $N=(150\times10^{-6}-120\times10^{-6})/8\times10^{-6}=3.75$. For calculation convenience, N may be taken as 4, and the number of the width-variating pixels in each width-variating pixel group 120A, 120B, . . . , or 120N is M/N=2, i.e. the width-variating pixel groups 120A, 120B, . . . , and 120N are composed of the width-variating pixel $120A_1/120A_2$, $120B_1/120B_2$, . . . , and $120N_1/120N_2$, respectively.

Hence, the first decreasing sequence $\{P_1, P_2, \ldots, P_N\}$ satisfies the following relationship:

$$P_i=P_0-i\times(P_0-P_N)/N, i=1,2,\ldots,N \quad (6)$$

wherein $P_i$ is the width of the i-th width-variating pixel group.

Example (continued): $(P_0-P_N)/N=(150\times10^{-6}-120\times10^{-6})/4=7.5\times10^{-6}$ m, and thus $P_1=150\times10^{-6}-1\times7.5\times10^{-6}=142.5\times10^{-6}$ m; $P_2=150\times10^{-6}-2\times7.5\times10^{-6}=135\times10^{-6}$ m; $P_3=150\times10^{-6}-3\times7.5\times10^{-6}=127.5\times10^{-6}$ m; $P_4=150\times10^{-6}-4\times7.5\times10^6=120\times10^{-6}$ m. Hence, the first decreasing sequence is $\{142.5\times10^{-6}, 135\times10^{-6}, 127.5\times10^{-6}, 120\times10^{-6}\}$.

The Second Decreasing Sequence $\{f_1, f_2, \ldots, F_N\}$

At first, the magnification ratio, $m_j$, $j=1, 2, \ldots, N$ corresponding to the j-th microstructure group of the focus-length-variating portion 210 of the lens 200 is calculated in accordance with the following relationship:

$$m_j=1-j\times(1-m_N)/N \quad (7)$$

Example (continued): $(1-m_N)/N=(1-0.8)/4=0.05$, and thus $m_1=1-0.05=0.95$; $m_2=1-2\times0.05=0.9$; $m_3=1-3\times0.05=0.85$; $m_4=1-4\times0.05=0.8$ Thereafter, the focus length of the j-th microstructure group $f_j$ is calculated in accordance with the following relationship:

$$f_j=d/(1-m_j) \quad (8)$$

Example (continued): $f_1=1\times10^{-3}/(1-0.95)=0.02$ m; $f_2=1\times10^{-3}/(1-0.9)=0.01$ m; $f_3=1\times10^{-3}/(1-0.85)=0.0067$ m; $f_2=1\times10^{-3}/(1-0.8)=0.005$ m. Hence, the second decreasing series is $\{0.02, 0.01, 0.0067, 0.005\}$ respectively corresponding to the first decreasing series $\{142.5\times10^{-6}, 135\times10^{-6}, 127.5\times10^{-6}, 120\times10^{-6}\}$.

Figure 4A:
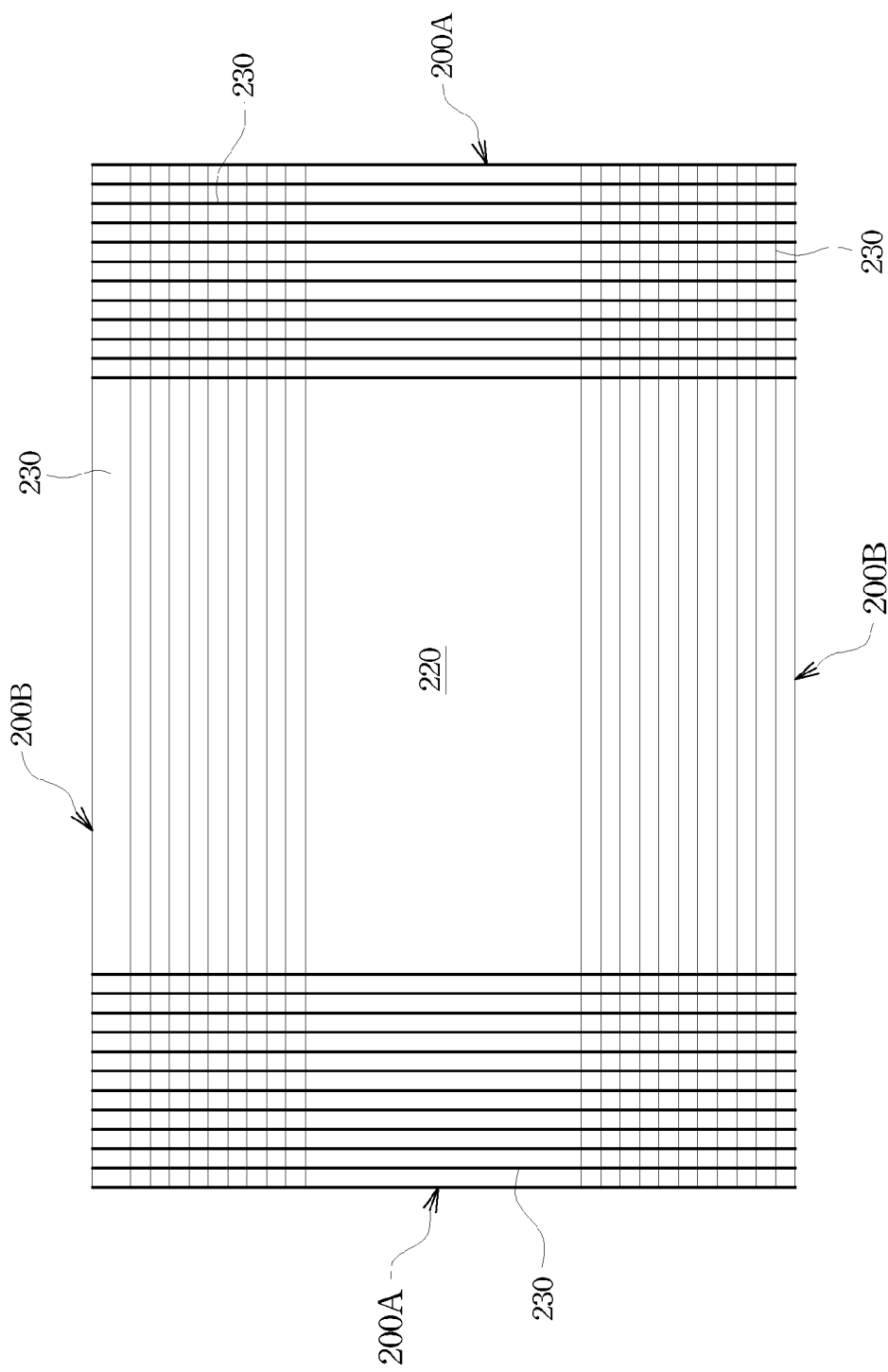
FIG. 4A is a schematic top view of a display apparatus according to another embodiment of the present invention.
Figure 4B:
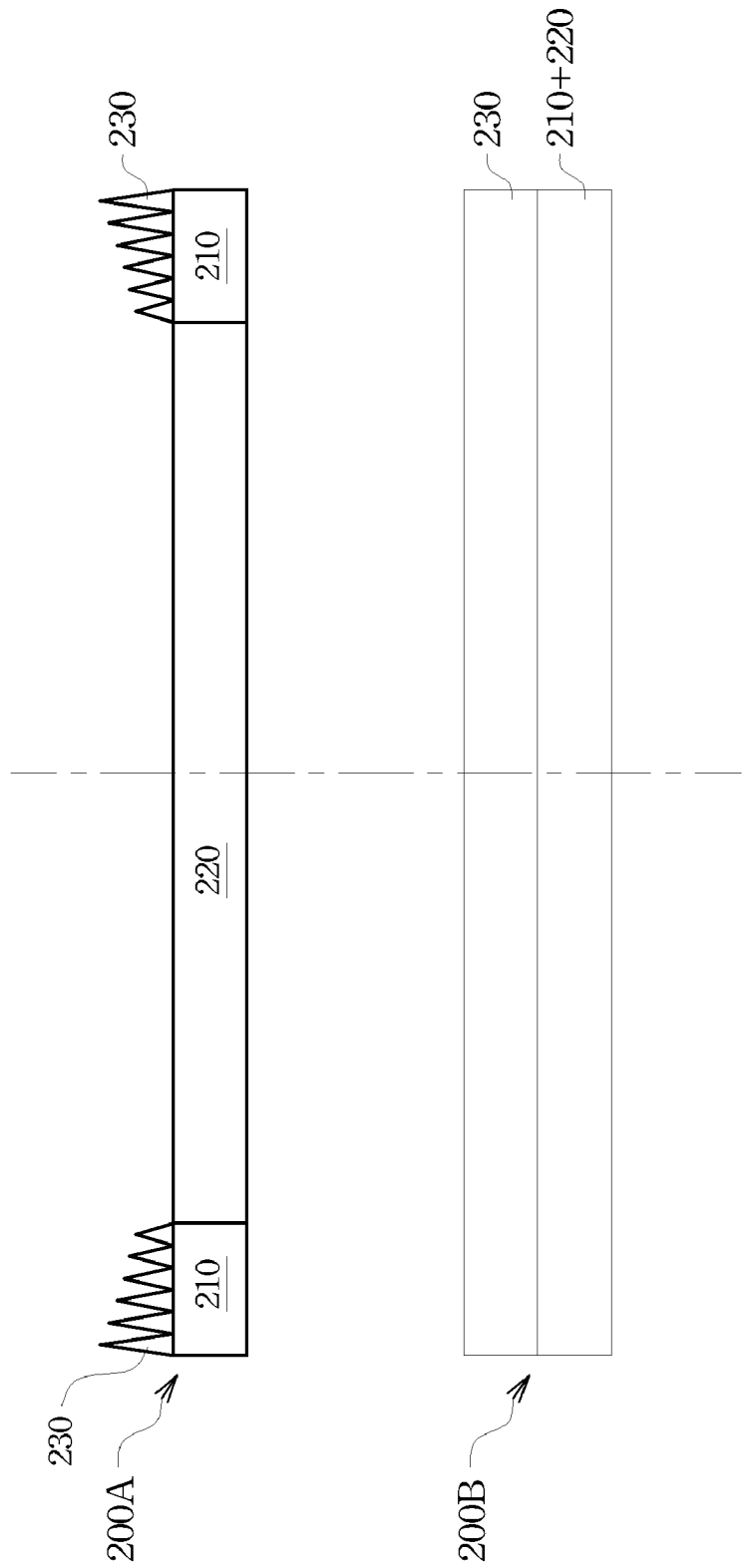
FIG. 4B is an exploded front view of the display apparatus shown in FIG. 4A.

Referring to FIG. 4A and FIG. 4B, FIG. 4A is a schematic top view of a display apparatus according to another embodiment of the present invention; and FIG. 4B is an exploded front view of the display apparatus shown in FIG. 4A. The lens of this embodiment is composed of two mutually overlapped lenses 200A and 200B each of which has variating focus lengths, wherein the respective structures of the lenses 200A and 200B are the same as the lens 200 shown in FIG. 3 besides the focus-length-variating portion 210 of the lens 200A is arranged in a direction different from that of the lens 200B. Such as shown in FIG. 4A, the focus-length-variating portion 210 of the lens 200A is distributed from the right and left sides to its center, and the focus-length-variating portion 210 of the lens 200B is distributed from the front and rear sides (or the upper and lower sides) to its center, thus forming a lens structure having a planar portion 220 at its central portion and focus-length-variating portions 210 at its surrounding edge portion.

Summing up the above, on the areas corresponding to both sides of the display area on the display panel, this embodiment applies the pixel groups having decreasing widths collaborated with the linear Fresnel lens having decreasing focus lengths, thereby magnifying the viewable area of the display panel and achieving the efficacy of shielding non-light emitting border area of the display panel. Further, for resolving the image twist problem caused by big view angles, this embodiment uses the minimum pixel difference value which can be distinguished by human eyes to set up the total variation amount of the pixels, and meanwhile, to determine how many different focus lengths are required for the lens accordingly. In comparison with the conventional skill using a circular Fresnel lens for two-dimensional magnification, the design of local one-dimensional magnification not only can reduce light loss by using the planar structure located in the central portion of the lens, but also can lower the occurrence probability of Moire stripes, darker and lighter stripes or ghosting phenomena. Moreover, when a specific non-light emitting border area of the panel needs shielding under the same design condition of non-spherical curvature, the facet angle or slope angle of the microstructure group required by the linear Fresnel lens with locally-variating focus lengths can be smaller than that by the conventional circular Fresnel lens with two-dimensional magnification.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A display apparatus, comprising:
a display panel having a width-fixed pixel zone, a width-variating pixel zone and a border zone arranged sequentially from its center to its edges, wherein there are a plurality of width-fixed pixels disposed in the width-fixed zone, and there are a plurality of width-variating pixel groups disposed in the width-variating pixel zone, the width-variating pixel groups having respective widths present in a first decreasing sequence $\{P_1,$

$P_2, \ldots, P_N\}$, wherein $P_0 > P_1$, $P_0$ representing the width of each of the width-fixed pixels; and a lens having a focus-length-variating portion and a planar portion, wherein the planar portion is aligned with the width-fixed pixel zone, and the focus-length-variating portion is disposed to correspond to the border zone and the width-variating pixel zone, the focus-length-variating portion having a plurality of microstructure groups, and respective focus lengths of the focus-length-variating portion corresponding to the width-variating pixel groups are present in a second decreasing sequence $\{f_1, f_2, \ldots, f_N\}$;

wherein the number of the width-variating pixel groups and the number of the microstructure groups are the same as an integer N, and each of the width-variating pixel groups is composed of at least one width-variating pixel, and the total number of the width-variating pixels of the width-variating pixel groups is a total count M, the total count M satisfying the following relationship:

$$M \geq (d \times \tan\theta)/P_0;$$

wherein M is a positive integer, d representing the distance between the display panel and the lens, θ representing a slant view angle.

2. The display apparatus as claimed in claim 1, wherein, in the width-variating pixel groups, one width-variating pixel group with a width $P_1$ is disposed closest to the width-fixed zone, and another width-variating pixel group with the width $P_N$ is disposed closest to the border zone.

3. The display apparatus as claimed in claim 1, wherein θ is ranged between 44.7° and 45.3°.

4. The display apparatus as claimed in claim 1, wherein the integer N satisfies the following relationship:

$$N \geq (P_0 - P_N)/PD;$$

$$P_N = P_0 \times m_N;$$

$$m_N = PA/FA;$$

$$PD \leq (VD \times \tan\alpha)/M;$$

wherein N is a positive integer; PD representing an allowable difference between two adjacent pixels, $m_N$ representing the smallest magnification ratio, and PA representing the width of the width-variating pixel zone, and FA represents the width of the focus-length-variating portion, and VD representing a view distance, a representing a visual angle of human eyes.

5. The display apparatus as claimed in claim 4, wherein α is ranged between 0.019° and 0.021°.

6. The display apparatus as claimed in claim 4, wherein the number of the at least one width-variating pixel in each of the width-variating pixel groups is equal to the total count M divided by the integer N.

7. The display apparatus as claimed in claim 4, wherein the first decreasing sequence $\{P_1, P_2, \ldots, P_N\}$ satisfies the following relationship:

$$P_i = P_0 - i \times (P_0 - P_N);$$

$$I = 1, 2, \ldots, N;$$

wherein $P_i$ represents the width of the i-th width-variating pixel group.

8. The display apparatus as claimed in claim 4, wherein the second decreasing sequence $\{f_1, f_2, \ldots, f_N\}$ satisfies the following relationship:

$$f_j = d/(1 - m_j);$$

$$m_j = 1 - j \times (1 - m_N)/N;$$

$$j = 1, 2, \ldots, N;$$

wherein $f_j$ represents the focus length of the j-th microstructure group, $m_j$ representing the magnification ratio corresponding to the j-th microstructure group.

9. The display apparatus as claimed in claim 1, wherein the lens is a Fresnel lens.

10. The display apparatus as claimed in claim 1, wherein an angle included between each of the microstructure groups and the planar portion is ranged between 0° and 41°.

11. A display apparatus, comprising:

a display panel having a width-fixed pixel zone, a width-variating pixel zone and a border zone arranged sequentially from its center to its edges, wherein there are a plurality of width-fixed pixels disposed in the width-fixed zone, and there are a plurality of width-variating pixel groups disposed in the width-variating pixel zone; and a lens having a focus-length-variating portion and a planar portion, wherein the planar portion is aligned with the width-fixed pixel zone, and the focus-length-variating portion is disposed to correspond to the border zone and the width-variating pixel zone, the focus-length-variating portion having a plurality of microstructure groups;

wherein the display panel is spaced from the lens at a distance d; each of the width-fixed pixels has a width $P_0$; the number of the width-variating pixel groups and the number of the microstructure groups are the same as an integer N, and the i-th width-variating pixel group has a width $P_i$, wherein i=1, 2, . . . , N; the focus-length-variating portion corresponding to the j-th width-variating pixel group has a focus length $f_j$, j=1, 2, . . . , N; and the j-th width-variating pixel group has a magnification ratio $m_j$, and $m_j$ is present in a decreasing sequence $\{m_1, m_2, \ldots, m_N\}$, and each of the width-variating pixel groups is composed of at least one width-variating pixel, and the total number of the width-variating pixels of the width-variating pixel groups is a total count M, the total count M satisfying the following relationship:

$$M \geq (d \times \tan\theta)/P_0;$$

wherein M is a positive integer, d representing the distance between the display panel and the lens, θ representing a slant view angle.

12. The display apparatus as claimed in claim 11, wherein the integer N satisfies the following relationship:

$$N \geq (P_0 - P_N)/PD;$$

$$P_N = P_0 \times m_N;$$

$$m_N = PA/FA;$$

$$PD \leq (VD \times \tan\alpha)/M;$$

wherein PD representing an allowable differential between two adjacent pixels, $m_N$ representing the smallest magnification ratio, PA representing the width of the width-variating pixel zone, FA representing the width of the focus-length-variating portion, VD representing a view distance, a representing a visual angle of human eyes, and the total count is a multiple of the integer N.

13. The display apparatus as claimed in claim 12, wherein FA ≥ PA+BA, BA representing the width of the border zone.

14. The display apparatus as claimed in claim 12, wherein α is ranged between 0.019° and 0.021°.

15. The display apparatus as claimed in claim 11, wherein θ is ranged between 44.7° and 45.3°.

16. The display apparatus as claimed in claim 11, wherein $m_j=1-j\times(1-m_N)/N$.

17. The display apparatus as claimed in claim 11, wherein $f_j=d/(1-m_j)$.

18. The display apparatus as claimed in claim 11, wherein an angle included between each of the microstructure groups and the planar portion is ranged between 0° and 41°.

* * * * *